(12) United States Patent
Hall et al.

(10) Patent No.: US 8,175,089 B2
(45) Date of Patent: May 8, 2012

(54) EXTENDED ADDRESS SPACE CAPABILITY FOR AN INDUSTRIAL PROTOCOL

(75) Inventors: Kenwood H. Hall, Hudson, OH (US);
Scot A. Tutkovics, Aurora, OH (US);
David A. Vasko, Solon, OH (US); Brian A. Batke, Novelty, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1288 days.

(21) Appl. No.: 11/239,936

(22) Filed: Sep. 30, 2005

(65) Prior Publication Data
US 2007/0076724 A1   Apr. 5, 2007

(51) Int. Cl.
*H04L 12/56* (2006.01)
*G06F 15/16* (2006.01)

(52) U.S. Cl. .............................. 370/389; 709/245

(58) Field of Classification Search .............. 370/338, 370/389, 466, 475; 709/245, 246, 250
See application file for complete search history.

(56) References Cited

U.S. PATENT DOCUMENTS

| | | | | |
|---|---|---|---|---|
| 5,122,948 A | * | 6/1992 | Zapolin | 340/3.53 |
| 5,664,101 A | * | 9/1997 | Picache | 709/250 |
| 6,061,603 A | * | 5/2000 | Papadopoulos et al. | 700/83 |
| 6,112,246 A | | 8/2000 | Horbal et al. | |
| 6,151,625 A | | 11/2000 | Swales et al. | |
| 6,240,478 B1 | * | 5/2001 | Brickell | 710/110 |
| 6,321,272 B1 | * | 11/2001 | Swales | 709/250 |
| 6,349,235 B1 | * | 2/2002 | Gibart et al. | 700/11 |
| 6,484,061 B2 | | 11/2002 | Papadopoulas et al. | |
| 6,523,065 B1 | | 2/2003 | Coombs et al. | |
| 6,624,388 B1 | | 9/2003 | Blankenship et al. | |
| 6,686,530 B2 | | 2/2004 | Juszkiewicz et al. | |
| 6,732,191 B1 | | 5/2004 | Baker et al. | |
| 6,952,727 B1 | | 10/2005 | Lindner | |
| 6,982,953 B1 | * | 1/2006 | Swales | 370/218 |
| 7,137,107 B1 | * | 11/2006 | Brown | 717/137 |
| 7,171,492 B1 | * | 1/2007 | Borella et al. | 709/245 |
| 7,460,917 B1 | * | 12/2008 | Reichard et al. | 700/47 |
| 7,606,890 B1 | * | 10/2009 | Baier et al. | 709/224 |
| 7,747,764 B2 | * | 6/2010 | Batke et al. | 709/230 |
| 2002/0091784 A1 | * | 7/2002 | Baker et al. | 709/208 |
| 2002/0156837 A1 | | 10/2002 | Batke et al. | |
| 2003/0051074 A1 | | 3/2003 | Edwards | |
| 2003/0139821 A1 | | 7/2003 | Papadopoulas et al. | |
| 2003/0185237 A1 | * | 10/2003 | Baker, Jr. | 370/469 |
| 2004/0010627 A1 | * | 1/2004 | Ellis et al. | 709/250 |
| 2004/0047340 A1 | * | 3/2004 | Ruckstuhl et al. | 370/352 |
| 2004/0088391 A1 | * | 5/2004 | Ascoli et al. | 709/222 |

(Continued)

OTHER PUBLICATIONS

Bryan, Douglas, "UDDI Version 2.04 API Specification," Jul. 2002, OASIS, UDDI Committee Specification.*

(Continued)

*Primary Examiner* — Man Phan
*Assistant Examiner* — Ryan Kavleski
(74) *Attorney, Agent, or Firm* — Turocy & Watson, LLP

(57) ABSTRACT

Systems and methods are provided for communicating with control objects according to a singular and unified address space. In one aspect, an industrial communications system is provided. The system includes a global address protocol that can be employed to communicate with local or remote networks. An industrial protocol is adapted to interface with the global address protocol, where a network component communicates with one or more control components via the industrial protocol and in accordance with an address supplied by the global address protocol.

30 Claims, 8 Drawing Sheets

U.S. PATENT DOCUMENTS

| | | | |
|---|---|---|---|
| 2004/0141517 A1 | 7/2004 | Balasubramanian et al. | |
| 2004/0250168 A1* | 12/2004 | Tichy et al. | 714/38 |
| 2005/0066104 A1* | 3/2005 | Train et al. | 710/305 |
| 2005/0174998 A1* | 8/2005 | Vesterinen et al. | 370/354 |
| 2006/0090097 A1* | 4/2006 | Ngan et al. | 714/6 |
| 2007/0019612 A1* | 1/2007 | Wada et al. | 370/349 |
| 2007/0061455 A1* | 3/2007 | Callaghan | 709/225 |
| 2007/0073850 A1* | 3/2007 | Callaghan et al. | 709/220 |

OTHER PUBLICATIONS

Christensen, Erik, "Web Services Description Language 1.1," Mar. 2001, W3C, W3C Note 15 Mar. 2001.*

ISA, "ANSI/ISA S88 Batch Control Part 1" 1995, Instrument Society of America.*

S. Deering, "Internet Protocol Version 6 Specification," Dec. 1998, Network Working Group, Request for Comments 2460.*

European Search Report dated May 21, 2007 for European Patent Application Serial No. EP06020478, 2 pgs.

Office Action mailed Sep. 20, 2007 for European Patent Application Serial No. 06020478.1, 1 page.

Office Action mailed Jan. 22, 2010 for Japanese Patent Application Serial No. 2006-268204, 5 pages.

Office Action mailed Jan. 8, 2010 for Chinese Patent Application Serial No. 200610142166.2, 10 pages.

* cited by examiner

EXTENDED ADDRESS SPACE CAPABILITY FOR AN INDUSTRIAL PROTOCOL

TECHNICAL FIELD

The subject invention relates generally to industrial control systems, and more particularly to systems and methods that provide a unified addressing space in an industrial protocol to enable communications across networks with a singular addressing mode.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In recent years, there has been a growing need to integrate industrial control systems across a plurality of different types of networks. One popular network that is now common in industrial environments is Ethernet. This network is often applied at medium or higher levels of a business network where components such as bridges, routers or other types of modules supply connectivity and communications to lower control networks in the factory. Due to the limited number of Internet Protocol (IP) addresses in the Ethernet IPV4 protocol, most industrial Ethernet interfaces only support a single IP address and use some other means to address interfaces within the industrial system. This usually requires a client system to support multiple addressing modes to select a single device, interface or object which adds complexity and cost to the overall system.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A flat and singular address space is integrated with an industrial control protocol to facilitate communications in an industrial automation environment. In one example of such address space, IPV6 or other singular address space is adapted for industrial control addressing. This enables mapping of individual objects, interfaces and devices to a unique IPV6 address, for example. Using this technique of a single addressing mode, the large IPV6 addressing space (or other global addressing space) can be used to address each object in the industrial system. Thus, in one example, an Ethernet interface card can respond to each object within its scope and contain the routing information to enable a message to reach the object generally using only the IPV6 address.

Each of the respective addresses can be mapped using a Domain Name Service (DNS) server to a user assigned name in order that each object can be addressed by a user assigned name. These names can be arranged into a hierarchy that corresponds to the user's problem or physical domain, for example. In one aspect, the DNS server or other directory service can map hierarchical names to an IPV6 address (or other global addressing scheme) and the industrial Ethernet interface would map the IPV6 address to an individual object in the industrial automation system. Each object could have multiple addresses, one to indicate its physical location and another to indicate its function in the logical description of the user's problem.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided for communicating with control objects according to a singular and unified address space. In this manner, control objects can be addressed according to a single protocol which mitigates configuration and design complexities of communicating through multiple network devices supporting multiple address spaces. In one aspect, an industrial communications system is provided. The system includes a global address protocol that can be employed to communicate with local or remote networks. An industrial protocol is adapted to interface with the global address protocol, where a network component communicates with one or more control components via the industrial protocol and in accordance with an address supplied by the global address protocol. In one example, the global address protocol can include an IPV6 protocol.

It is noted that as used in this application, terms such as "component," "protocol," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
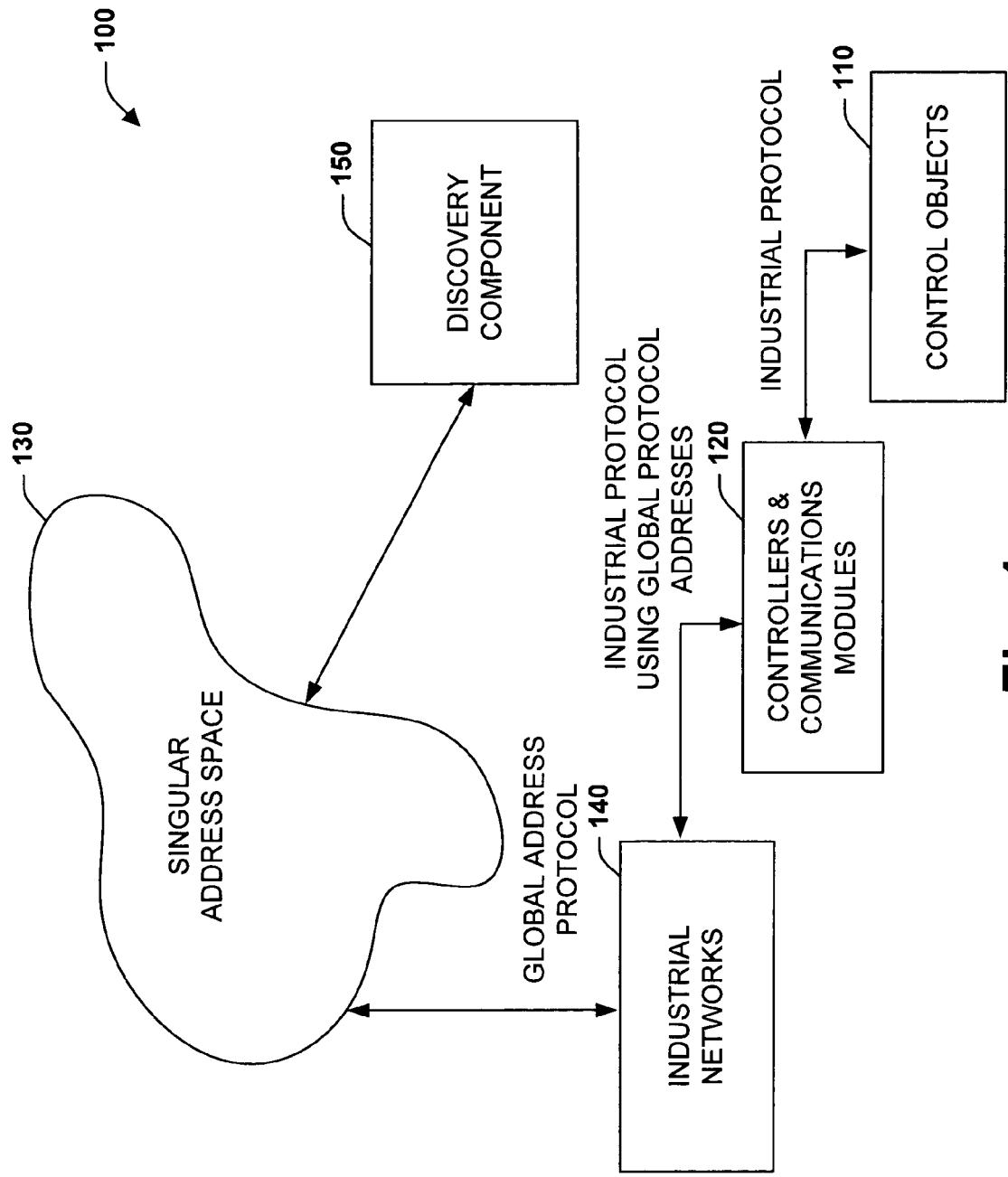
FIG. 1 is a schematic block diagram illustrating industrial control system network communications.

Referring initially to FIG. 1, a system 100 illustrates industrial control communications and network protocols. The system 100 includes a plurality of control objects 110 (or components) that communicate to one or more one or more controllers and/or communications modules 120 via an industrial protocol. The control objects 110 are assigned a network address according to a flat and singular address convention or space illustrated at 130. One or more networks are employed to interface with the singular address space 130 and interact with the control objects according to address supplied by the space 130. Network interfaces 120 can reside on a controller, communications module, and/or as a separate entity. A discovery component 150 can be employed to locate control objects 110, controllers 120, or networks 140 employing logical naming conventions versus explicit addresses. It is to be appreciated that a combination of explicit addressing and/or logical addressing can be employed to communicate with the controllers 120 and respective control objects 110.

In general, the singular address space 130 can be integrated with an industrial control protocol to facilitate communications in the system 100. In one example of such address space, IPV6 (e.g., Ethernet) is adapted for industrial control addressing. This enables mapping of individual control objects 110, networks 140 and devices 120 to a unique IPV6 address. Using this single addressing mode, the large, flat IPV6 addressing space can be used to address each control object 110 in the industrial system 100. An interface card at 120 can respond to each control object 110 within its scope and contain the routing information to enable a message to reach the object generally using only the global address supplied by the space 130. It is to be appreciated, that substantially any higher level global network protocol that allows addresses to be migrated and resolve lower level control objects is considered within the scope provided herein.

Generally, each of the respective addresses 130 can be mapped using the discovery component 150 (e.g., a Domain Name Service (DNS) server) to a user assigned name in order that each object 110 can be addressed by a user assigned name. These names can be arranged into a hierarchy that corresponds to the user's problem or physical domain, for example. In one aspect, the DNS server or discovery component 150 can map hierarchical names to an address 130 and the industrial interface 120 can map the address to an individual object 110 in the industrial automation system 100. It is noted that each control object 110 can have multiple addresses, one to indicate its physical location and another to indicate its function in a logical description of the user's factory or environment.

Before proceeding, it is noted that the system 100 can include various computer or network components such as servers, clients, communications modules, mobile computers, wireless components, and so forth which are capable of interacting across the networks 140. Similarly, the term PLC or controller as used herein can include functionality that can be shared across multiple components, systems, and/or networks. For example, one or more PLCs at 120 can communicate and cooperate with various network devices across the networks 140. This can include substantially any type of control, communications module, computer, I/O device, Human Machine Interface (HMI) that communicate via the network which includes control, automation, and/or public networks. The PLC or controller/communication module 120 can also communicate to and control various other devices or control objects 110 such as Input/Output modules including Analog, Digital, Programmed/Intelligent I/O modules, other programmable controllers, communications modules, software components, and the like.

The networks in the system 100 can include public networks such as the Internet, Intranets, and automation networks such as Common Industrial Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
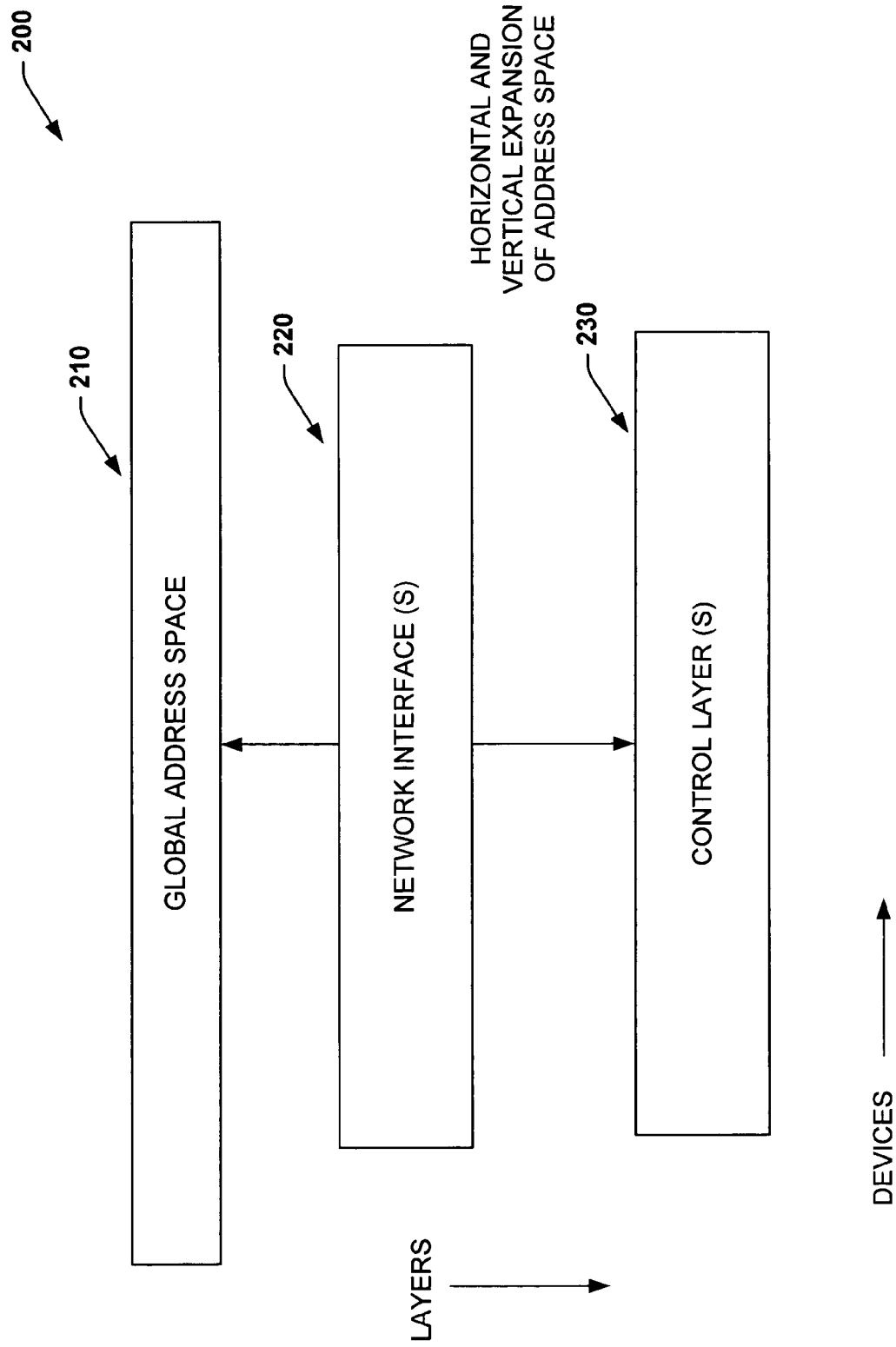
FIG. 2 is a diagram illustrating an example network and addressing structure.

Referring now to FIG. 2, an example network structure 200 is illustrated. The top of the structure 200 is represented by a global address space 210 than can be employed to address devices at lower levels of an enterprise and across control networks. From these addresses 210, one or more network interfaces can be provided at 220. These interfaces 220 can apply the addresses 210 to one or more control layers 230 that are operatively coupled to the interfaces. It is noted, that the network interface 220 and control layer 230 can include multiple dimensions supporting a plurality of configurations. For instance, the network interfaces can include multiple layers in a vertical direction on the diagram, where each respective layer is a differing type of industrial network. Similarly, at any given network interface layer 220, a plurality of network interface components or devices could exist at that layer to interface to a respective control layer 230. Along with the network interface having vertical and horizontal dimensions, the control layer can similarly have multiple dimensions, where a plurality of control components can exist on any given control layer 230 and/or a plurality of control layers can be configured for communications with the global address space 210.

As noted above, IPV6 protocol or other singular addressing mode can be employed as the protocol for the global address space 210. Lower level devices at the control layers 230 can be located and communicated with by assigning such devices addresses from the global address space. In one specific example, a control message may be generated using IPV6 protocol where the message originates from Europe. The message is designated and addressed to a controller operating on a control layer 230 in the U.S. The controller may be operating on a Common Industrial Protocol (CIP) Network or a device network, yet be assigned an absolute address from the global address space 210. Thus, the remote message originating from Europe sends a control message to the device on the factory network as if the device were operating in the global address space. As can be appreciated, a plurality of communications and messages can be provided from local and/or remote networking sources. To continue the example, a discovery component (not shown) such as a DNS can be employed to provide logical naming conventions for control layer devices or components 230 to be determined from the global address space.

Figure 3:
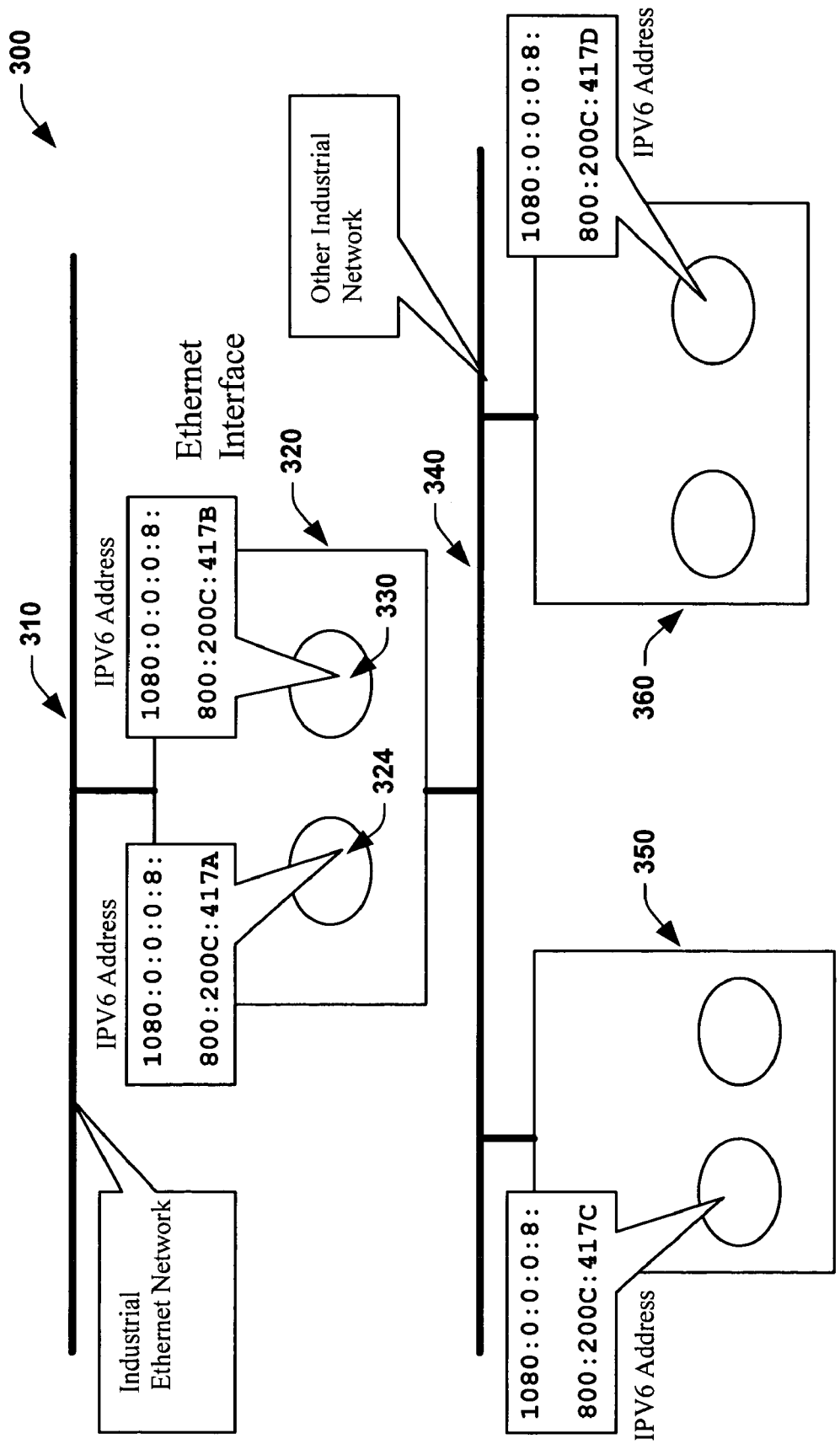
FIG. 3 is a diagram illustrating communications according to an Ethernet IPV6 protocol.

Turning to FIG. 3, an example system 300 illustrates communications according to an Ethernet IPV6 protocol. The system 300 shows an industrial Ethernet network at 310 where an Ethernet interface 320 communicates with the network. As noted above, there can be a plurality of such interfaces communicating with the network 320. In this example, two IPV6 addresses are assigned at 324 and 330 respectively. Below the layer at 320, resides another industrial network 340 which can be substantially any type of network. In this example, two control objects 350 and 360 respectively are also assigned with an IPV6 address. Thus, these control objects 350 and 360 can be addressed on their local industrial networks 340 (e.g., CIP protocol, ModBus, ProfiNet) according to an address that is assigned from the address space in the Ethernet domain 310. In this manner, the Ethernet interface 320 can be designed for a single addressing scheme and without having to convert addresses to local industrial addressing schemes at 340. As can be appreciated, a plurality of control objects can exist at the network layer 340. Also, more than one layer 340 can be provided that supports IPV6 addressing where some layers are nested below other layers.

It is noted that IPv6 addresses can be assigned to specific objects within a CIP protocol, for example. The IPv6 addresses can be assigned to particular control functions beyond CIP protocols and can be assigned to any type of entity or construct in the control system, e.g., tags (named data), routines, entities that are associated with a plant or enterprise model, and so forth. When assigning IPv6 addresses to objects within devices, there are different models that can be employed. These can include where a device has a single instance of a CIP (or other) protocol stack, with a single application addressing space. Multiple IPv6 addresses could be managed at a level above the industrial protocol stack, and the protocol stack would not need to have knowledge of that detail. There could also be an overall directory mechanism that would allow the discovery of which IPv6 address corresponds to which entity. When the IP address was obtained, normal protocol mechanisms can be employed to access the entity.

In another example, each IP address can refer to a "device within a device" (from the CIP perspective, for example). Also, each IP address could refer to a separate CIP device model and CIP addressing space within a single physical device. The CIP (or other protocol) addressing model can be modified to natively support using IP addresses and DNS names to refer to specific objects, if desired. In yet another addressing example, at 340 for other industrial networks, devices connected to the "other" network 340 can be native IPv6 devices, with an IPv6 stack. This can include having a router between an Ethernet network, for example, and the "other" network 340. Another approach is to make the "other" network 340 appear as though it is an IPv6 network to IPv6 devices. This can include having a gateway or translation function between the IPv6 and other devices. Thus, IPv6 router devices can be employed between the Ethernet and "other" networks and/or also a gateway device can be employed that can seamlessly connect an IPv6 network with a non-IPv6 industrial network (making it appear as IPv6).

Figure 4:
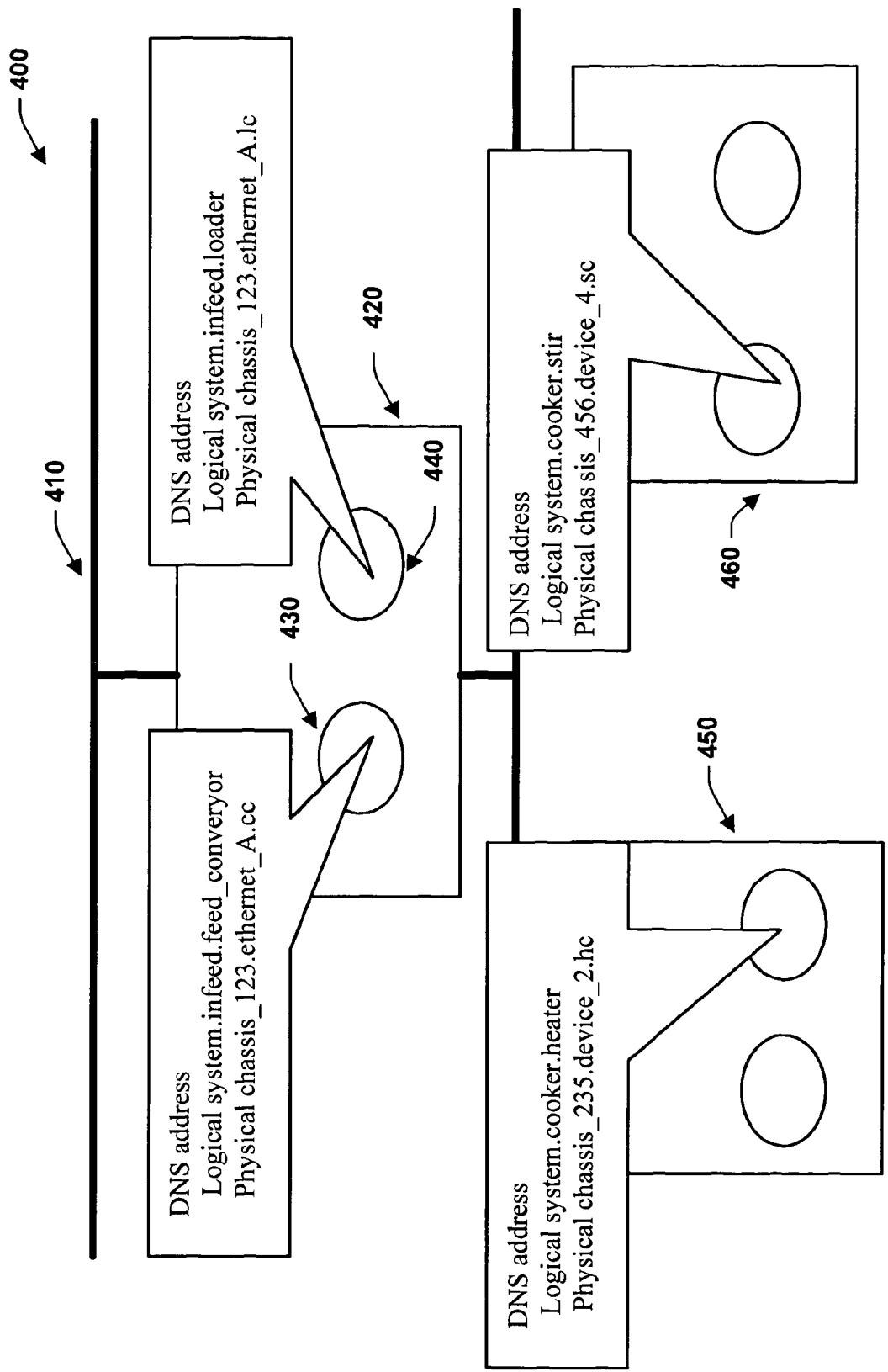
FIG. 4 is a diagram illustrating a communications according to an Ethernet IPV6 protocol and a domain name service addressing scheme.
Figure 5:
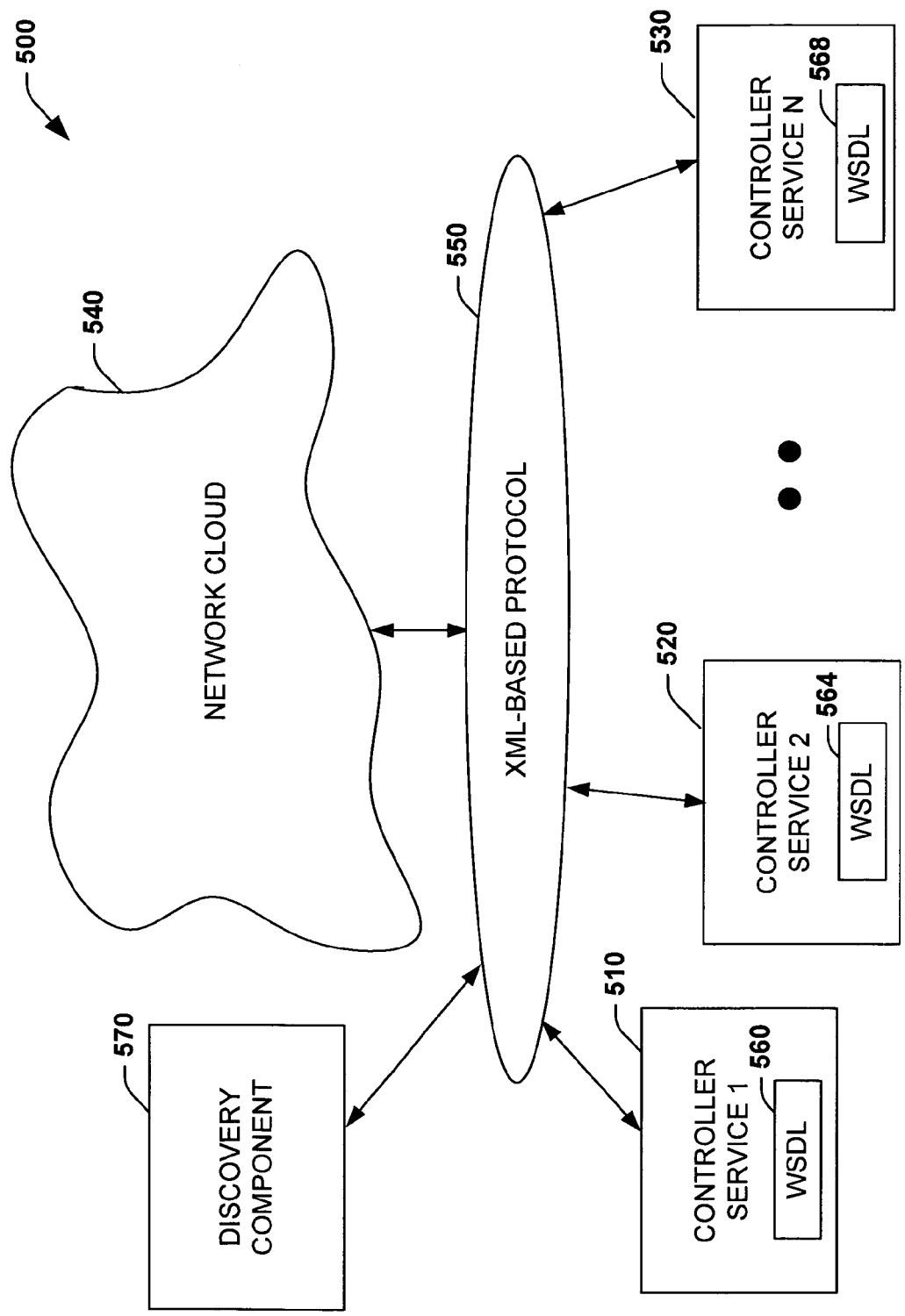
FIG. 5 is a diagram illustrating an alternative network communication system.

Referring to FIG. 4, an example system 400 illustrates communications according to an IPV6 protocol and domain name service addressing scheme. The system 400 is similar to the example system 300 described above with respect to FIG. 3. In this case, logical addresses are employed for communications, where such addresses can be resolved from logical names via a DNS server or other type discovery component performing a look-up which is described in more detail below. In this example, an IPV6 network 410 feeds an interface module 420 having two logical DNS addresses. For instance, at 430, a feed conveyor is addressed that is resolved to a physical chassis. At 440, a system loader is addressed that resolves to a different chassis name. From the interface 420, a control object heater communicated with at 450 and a control object stirring device is addressed at 460. As can be appreciated, a plurality of such chassis and devices can be so addressed. In another aspect, components can be provided to obtain a dynamic or auto-configured IP address and automatically cause a DNS system to be updated, associating the component's name with the newly obtained IP address. Such capability would allow components to be referenced by name, replicated in different locations, without manually configuring and associating specific IP addresses with names Referring now to FIG. 5, a system 500 illustrates alternative networking aspects. In this aspect, other communications protocols can be employed in conjunction with the global addressing schemes described above. A plurality of controller services 510 through 530 interact with a global address network cloud 540 via an XML-based protocol 550 that can be employed with the industrial protocols described above. The protocol 550 can be an open standard defined for use on a public communications system such as the Internet. In one aspect, a Simple Object Access Protocol (SOAP) 550 can be employed as a communications protocol for XML Web services. SOAP is an open specification that defines an XML format for messages between services. The specification can include describing how to represent program data as XML and how to utilize SOAP to perform Remote Procedure Calls. These optional parts of the specification are employed to implement Remote Procedure Call (RPC)-style applications, wherein a SOAP message containing a callable function, and the parameters to pass to the function, is sent from a client such as a control system, and the server returns a message with the results of the executed function. Most current implementations of SOAP support RPC applications since programmers who are familiar to COM or CORBA applications understand the RPC style. SOAP also supports document style applications whereby the SOAP message is provided as a wrapper around an XML document. Document-style SOAP applications are very flexible, wherein a control system XML Web service can take advantage of this flexibility to build controller services that may be difficult to implement with RPC.

The controller services 510 through 530 can also employ an open interface standard such as a Web Service Description Language (WSDL) illustrated at 560 through 568 in order to provide interactions with the controller services. In general, a WSDL file or interface is an XML document that describes a set of SOAP messages and how the messages are exchanged. In other words, WSDL 560-564 is to SOAP what Interface Description Language (IDL) is to CORBA or COM. Since WSDL is in XML format, it is readable and editable but in most cases, it is generated and consumed by software. WSDL specifies what a request message contains and how the response message will be formatted in unambiguous notation. As an example, an I/O service can specify how inputs are to be requested from the service and how outputs can be sent to the service in the form of a response. In another aspect, inputs can be requested from an input service, wherein the response is a confirmation that the inputs were received. Outputs can be sent to an output service in the form of a request, wherein the response from the service is that the outputs were received. As can be appreciated, the controller services can be executed at various network layers in a control system where such layers are addressable via the global and singular addressing schemes describe above.

The system 500 can also include a discovery component 570, wherein the controller services 510-530 can be published and determined. In one aspect, a Universal Discovery Description and Integration (UDDI) can be provided at 570 that serves as a type of logical "phone" directory (e.g., "yellow pages," "white pages," "green pages") describing Web services. A UDDI directory entry is an XML file that describes a controller system and the services it offers. There are generally three parts to an entry in the UDDI directory. The "white pages" describe the component offering the service: name, address, and so forth. The "yellow pages" include industrial categories based on standard taxonomies such as the North American Industry Classification System and Standard Industrial Classifications. The "green pages" describe the interface to the service in enough detail for users to write an application to employ the Web service. The manner services are defined is through a UDDI document called a Type Model or tModel. In many cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a control process. The discovery component 570 can be employed with a global addressing scheme such as Ethernet IPV6 for example to locate lower level control elements such as the controller service 510-530.

Figure 6:
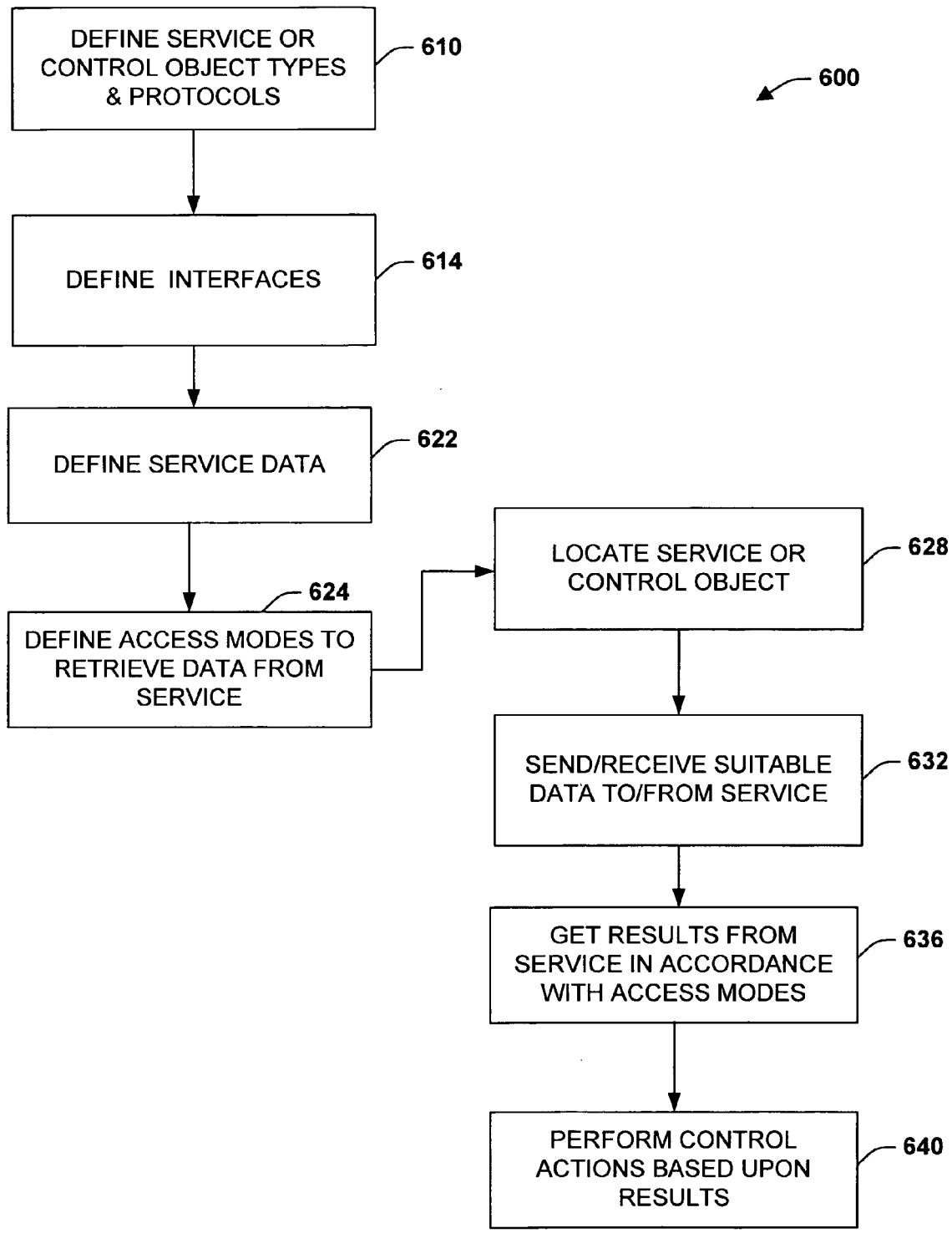
FIG. 6 is a flow diagram illustrating a communications process for s singular address space.

FIG. 6 illustrates a process 600 for communicating over s singular address space. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

At 610, one or more controller service types and protocols are defined in accordance with open standards. As noted above, this can include Ethernet IPV6 protocols that communicate across industrial networks. Other protocols can include XML based protocols for interacting with the service. The service types can be defined as a processing service, a logic service, an input and/or an output service, and a controller information service, for example. As can be appreciated a plurality of control and communications objects can be defined. At 614, interfaces are defined in accordance with global or singular address space. For example, this can include interfaces that describe how control requests and responses are processed by the control objects and how addresses are transported across networks.

It is noted that other publicly available standards/protocols/services may be employed. For example an enterprise service may be defined that coordinates different portions of a business or control process (e.g., batch, quality, ERP) throughout various portions of an organization. To facilitate consistent batch quality, for example, a service can be defined and offered which follows an international standard for modular batch automation, such as defined by standard (S88, S95), which also defines models and terminology for identifying equipment capability and procedures for producing batches. These procedures and capabilities can be defined and offered by an associated service. These standards specify the information flow between enterprise and manufacturing control. Thus, remote services can be offered that are modeled on these international standards and operate to coordinate control processes from the plant floor throughout the businesses that employ the control processes.

Proceeding to 622, service data is defined that describes data consumed by and produced by a respective service object. In general, XML can be employed to define the data but other type data including industrial control data can also be exchanged with the service. At 624, access modes can be defined for a service. This can include defining whether a service or object is polled for data results, the service broadcasts data after processing has been achieved, and/or the service is configured in a request and reply mode to exchange data in response to a specific request to the service.

At 628, controller services or objects are located. As noted above, this can include polling a UDDI directory to determine the service and respective interfaces. At 632, after a controller object has been located across global address space, data is exchanged with the service to affect operations of a control process (e.g., automatically exchanging I/O data with I/O service to automatically perform remote processing service). At 636, results are retrieved from a respective service or control object in accordance with the access modes defined at 624. For example, a processing service may poll a status service at periodic intervals to retrieve plant floor status information that is aggregated from a plurality of network devices. At 640, one or more control actions may be performed based upon the results retrieved from 636. For example, an I/O service may energize an output device based upon a processing result received from a processing service.

Figure 7:
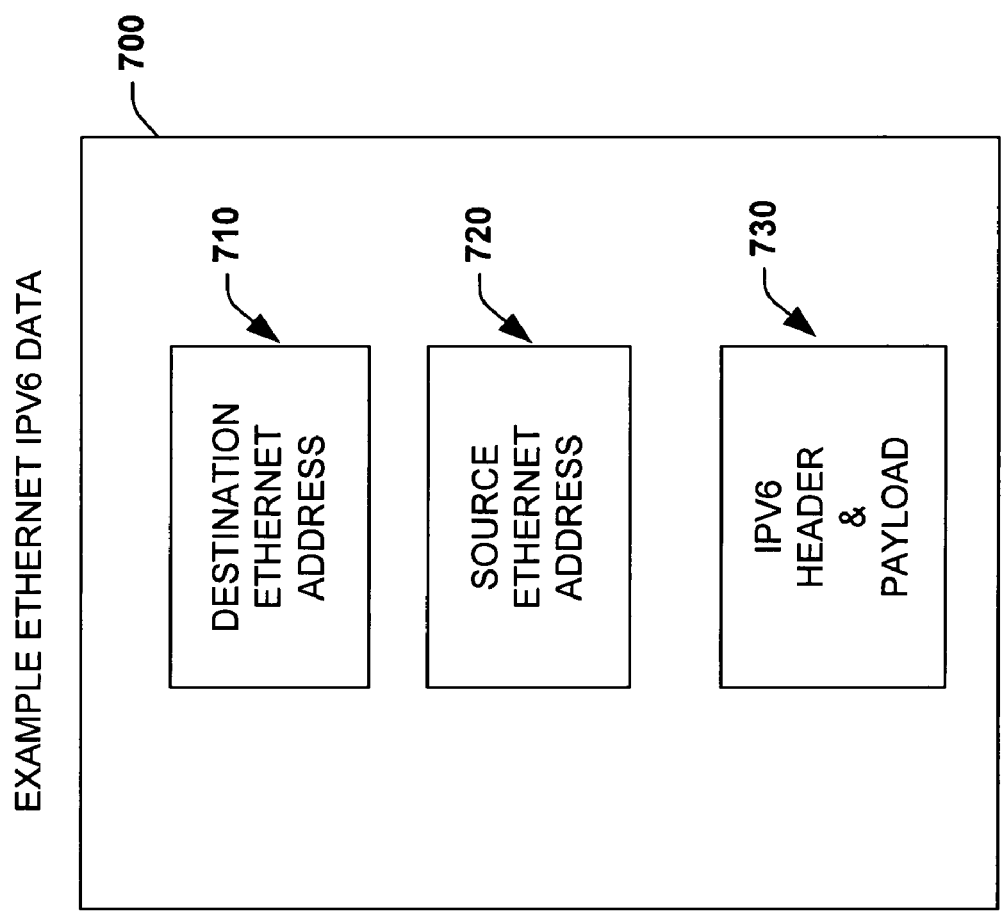
FIG. 7 is a diagram illustrating an example Ethernet IPV6 data packet for communications with an industrial control system.

FIG. 7 illustrates an example IPV6 data packet 700 for addressing control objects within industrial control systems. As illustrated, the data packet 700 can include a destination Ethernet address 710, a source Ethernet address 720, and an IPV6 header and payload portion 730. In general, a default maximum transmission unit (MTU) size for IPv6 packets 700 on an Ethernet is 1500 octets. This size may be reduced by a Router Advertisement containing an MTU option which specifies a smaller MTU, or by manual configuration of each node. If a Router Advertisement received on an Ethernet interface has an MTU option specifying an MTU larger than 1500, or larger than a manually configured value, that MTU option may be logged to system management or discarded.

In general, IPV6 is a new version of the Internet Protocol, designed as the successor to IP version 4 (IPv4) [RFC-791]. IPv6 increases the IP address size from 32 bits to 128 bits, to support more levels of addressing hierarchy, a much greater number of addressable nodes, and simpler auto-configuration of addresses. The scalability of multicast routing is improved by adding a "scope" field to multicast addresses. And a new type of address called an "anycast address" is defined, used to send a packet to any one of a group of nodes. Some IPv4 header fields have been dropped or made optional, to reduce the common-case processing cost of packet handling and to limit the bandwidth cost of the IPv6 header. Changes in the way IP header options are encoded allows for more efficient forwarding, less stringent limits on the length of options, and greater flexibility for introducing new options in the future. A new capability is added to enable the labeling of packets belonging to particular traffic "flows" for which the sender requests special handling, such as non-default quality of service or "real-time" service. Other extensions are provided to support authentication, data integrity, and (optional) data confidentiality.

A frame format for the packets 700 includes IPv6 packets that are transmitted in standard Ethernet frames. The Ethernet header contains the Destination and Source Ethernet addresses and the Ethernet type code, which contains the value 86DD hexadecimal. The data field contains the IPv6 header followed by the payload, and possibly padding octets to meet the minimum frame size for the Ethernet link. An interface identifier [AARCH] for an Ethernet interface is based on an EUI-64 identifier [EUI64] derived from the interface's built-in 48-bit IEEE 802 address. The EUI-64 can be formed as follows.

The EUI of the Ethernet address (the first three octets) becomes the company_id of the EUI-64 (the first three octets). The fourth and fifth octets of the EUI are set to the fixed value FFFE hexadecimal. The last three octets of the Ethernet address become the last three octets of the EUI-64. The Interface Identifier is then formed from the EUI-64 by complementing the "Universal/Local" (U/L) bit, which is the next-to-lowest order bit of the first octet of the EUI-64. Complementing this bit will generally change a 0 value to a 1, since an interface's built-in address is expected to be from a universally administered address space and have a globally unique value.

A universally administered IEEE 802 address or an EUI-64 is signified by a 0 in a U/L bit position, while a globally unique IPv6 Interface Identifier is signified by a 1 in the corresponding position. For example, the Interface Identifier for an Ethernet interface whose built-in address is, in hexadecimal, is 34-56-78-9A-BC-DE would be 36-56-78-FF-FE-9A-BC-DE. A different MAC address set manually or by software should not be used to derive the Interface Identifier. If such a MAC address is used, its global uniqueness property should be reflected in the value of the U/L bit. An IPv6 address prefix used for stateless network auto-configuration [ACONF] of an Ethernet interface has a length of 64 bits.

Figure 8:
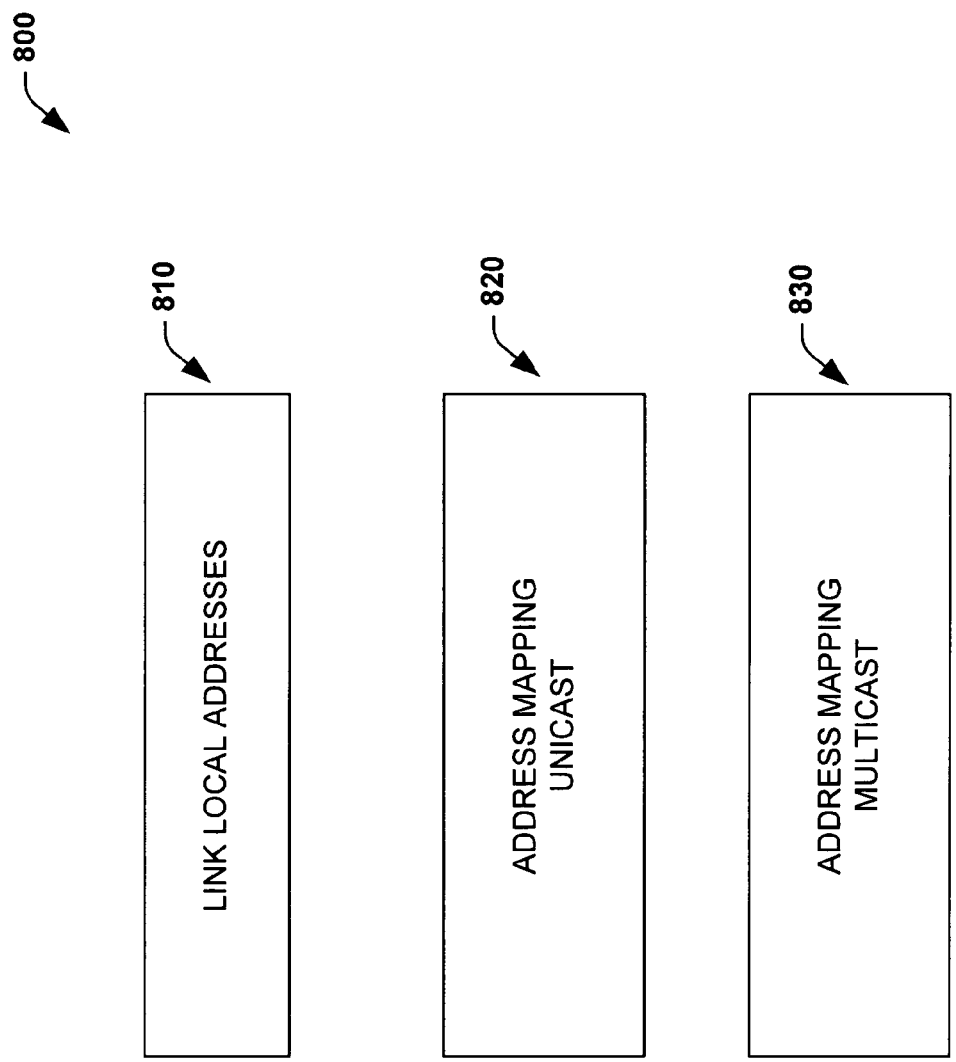
FIG. 8 is a diagram illustrating example Ethernet IPV6 addressing modes.

FIG. 8 illustrates example Ethernet IPV6 address modes 800 for communicating with industrial control systems. In general, Ethernet addressing can include local link addresses 810, unicast addressing 820, and multicast addressing 830. For Link-Local Addresses 810, an IPv6 link-local address [AARCH] for an Ethernet interface is formed by appending the Interface Identifier to the prefix FE80::/64. For Unicast address mapping 820, a Source/Target Link-layer address option has the following form when the link layer is Ethernet. These include option fields specifying Type 1 for Source Link-layer address and Type 2 for Target Link-layer address. A length can be specified in units of 8 octets. The Ethernet Address is a 48 bit Ethernet IEEE 802 address, in canonical bit order. This is the address the interface currently responds to, and may be different from the built-in address used to derive the Interface Identifier.

With respect to multicast address mapping 830, an IPv6 packet with a multicast destination address DST, consisting of the sixteen octets DST[1] through DST[16], is transmitted to the Ethernet multicast address whose first two octets are the value 3333 hexadecimal and whose last four octets are the last four octets of DST. In general, there may be some differences with older version of Ethernet. The following are possible functional differences between older versions such as an Address Token, which was a node's 48-bit MAC address, is replaced with the Interface Identifier, which is 64 bits in length and based on the EUI-64 format [EUI64]. An IEEE-defined mapping exists from 48-bit MAC addresses to EUI-64 form. A prefix used for stateless auto-configuration is 64 bits long rather than 80. The link-local prefix is shortened to 64 bits.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial communications system, comprising:
at least one processor;
at least one memory communicatively coupled to the at least one processor, the at least one memory having stored therein computer-executable instructions, comprising:
a global address protocol configured to assign unique global addresses to one or more control objects on one or more industrial networks wherein a unique global address allows a sent message to reach a control object to which the unique global address is assigned; and
a Domain Name Service (DNS) server configured to map user-assigned names to the unique global addresses, wherein the user-assigned names are arranged into a hierarchy that corresponds to a problem description or a physical domain of a factory, wherein the one or more control objects is assigned multiple unique global addresses, wherein at least one of the multiple unique global addresses indicates a physical location of the at least one of the one or more control objects in a logical description of the factory and at least one other of the multiple unique global addresses indicates a function of the at least one of the one or more control objects in the logical description of the factory; and
at least one network component configured to communicate with the one or more control objects via their respective unique global address assigned by the global address protocol.

2. The system of claim 1, wherein the one or more control objects are associated with at least one of a programmable logic controller, a communications module, an input module, an output module or a network component.

3. The system of claim 1, wherein the global address protocol is an Ethernet IPV6 protocol.

4. The system of claim 1, wherein the one or more industrial networks employs an industrial protocol that includes at least one of a Common Industrial Protocol (CIP), ProfiNet protocol, or a protocol associated with ModBus.

5. The system of claim 1, further comprising an interface card configured to respond to a subset of the one or more control objects within a scope of the interface card and supply routing information to enable a message to reach the subset of control objects using only the unique global address.

6. The system of claim 1, further comprising a user interface configured to manage the hierarchy to obtain a dynamic or auto-configured Internet Protocol address.

7. The system of claim 1, further comprising one or more network layers and one or more control layers configured to employ the global address protocol, the respective layers having one or more communications or control objects per layer.

8. The system of claim 1, further comprising a component configured to send a message utilizing the global address protocol from one system to another system employing an industrial protocol.

9. The system of claim 1, further comprising a network component configured to employ a single addressing mode to address higher level network components and lower level control components.

10. The system of claim 9, further comprising one or more nested control objects configured to are each assigned a unique global address from the global address protocol.

11. The system of claim 1, further comprising an interface configured to assign logical factory names that are mapped to the unique global addresses.

12. The system of claim 1, further comprising a Simple Object Access Protocol configured to facilitate network communications.

13. The system of claim 1, further comprising a Web Service Description Language (WSDL) component configured to provide interactions with one or more controller services.

14. The system of claim 1, further comprising a Universal Discovery Description and Integration (UDDI) component configured to facilitate locating network components.

15. The system of claim 1, further comprising at least one of a processing service, a logic service, an input service, an output service, or a controller information service, that are located via the global address protocol.

16. The system of claim 15, further comprising a protocol configured to facilitate communications with an S88 or S95 control model.

17. An industrial control communications method, comprising:
    assigning multiple unique global addresses to a control object on a communication network within an industrial control system, wherein a unique global address allows a message sent using the unique global address from the communication network to reach the control object; and
    mapping user-assigned names to the multiple unique global addresses, wherein the user-assigned names are arranged into a hierarchy that corresponds to a problem description or a physical domain of a factory wherein at least one of the multiple unique global addresses indicates a physical location of the control object in a logical description of the factory and at least one other of the multiple unique global addresses indicates a function of the control object in the logical description of the factory; and
    communicating with the control object using at least one of the multiple unique global addresses or user-assigned names.

18. The method of claim 17, wherein the multiple unique global addresses conforms to an IPV6 standard.

19. The method of claim 17, wherein the control object comprises at least one of a programmable logic controller, a communications module, an input module, an output module or a network component.

20. The method of claim 17, wherein the control object comprises at least one of a tag, a routine, or an entity associated with a factory model.

21. The method of claim 17, further comprising associating at least one protocol stack with a single application addressing space.

22. The method of claim 17, further comprising defining a directory that allows discovery of a respective IPv6 address that corresponds to the control object.

23. The method of claim 17, further comprising defining an Internet Protocol (IP) address that refers to an Input/Output module within the industrial control system.

24. The method of claim 23, further comprising defining the IP address to refer to a separate device model and addressing space within a single physical device.

25. The method of claim 17, further comprising employing an IPv6 router or an IPv6 gateway device to communicate between at least two different networks or network devices.

26. An industrial control communications system, comprising:
    means for assigning multiple unique global address to a control object on a communication network within an industrial control system, wherein a unique global address allows a message sent using the unique global address from the communication network to reach the control object; and
    means for mapping user-assigned names to the multiple unique global addresses, wherein the user-assigned names are arranged into a hierarchy that corresponds to a problem description or a physical domain of a factory wherein at least one of the multiple unique global addresses indicates a physical location of the control object in a logical description of the factory and at least one other of the multiple unique global addresses indicates a function of the control object in the logical description of the factory; and
    means for communicating to the control object via at least one of the multiple unique global addresses or user-assigned names.

27. The system of claim 26, further comprising means for locating control objects according to a logical object description.

28. The system of claim 26, wherein the control object is associated with at least one of a programmable logic controller, a communications module, an input module, an output module or a network component.

29. The system of claim 26, wherein the mean for communicating utilizing a single addressing mode to address a plurality of control objects within the industrial control system.

30. A non-transitory computer-readable medium having instructions stored thereon that, in response to execution, cause at least one device to perform operations, comprising:
    assigning multiple unique global address to a control object on a communication network within an industrial control system, wherein a unique global address allows a message sent using the unique global address from the communication network to reach the control object; and
    mapping user-assigned names to the multiple unique global addresses, wherein the user-assigned names are arranged into a hierarchy that corresponds to a problem description or a physical domain of a factory wherein at least one of the multiple unique global addresses indicates a physical location of the control object in a logical description of the factory and at least one other of the multiple unique global addresses indicates a function of the control object in the logical description of the factory; and
    communicating to the control object via at least one of the multiple unique global addresses or user-assigned names.

* * * * *